Sept. 13, 1932.     E. L. CONNELL     1,876,616
POWER TOOL
Filed Dec. 3, 1929
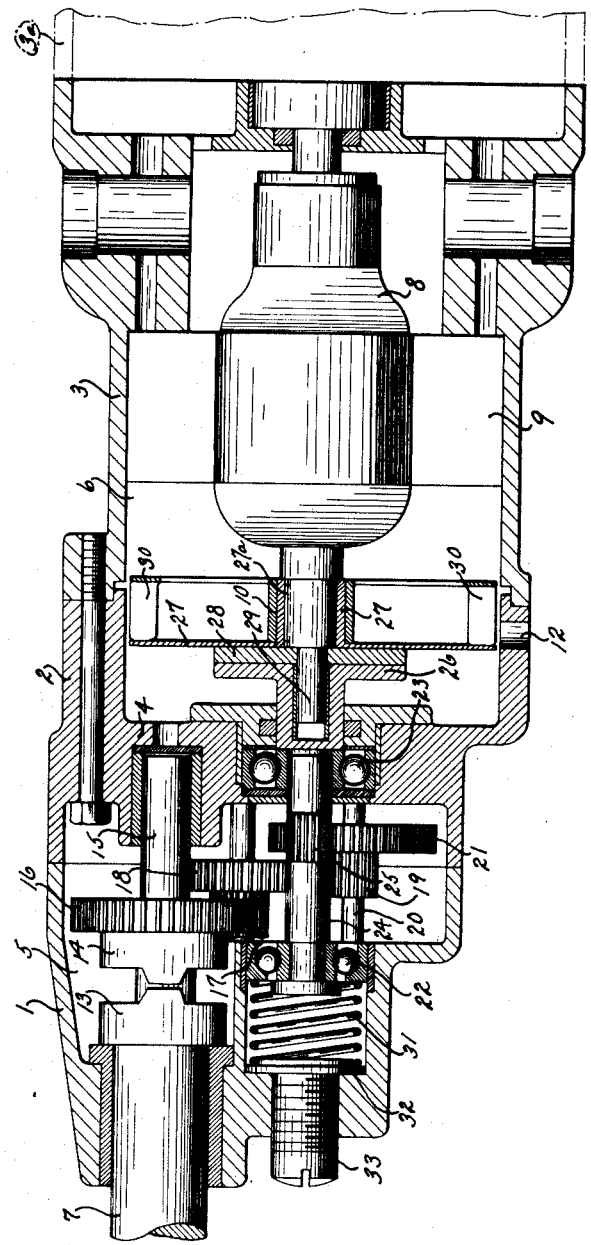
INVENTOR
Edwin L. Connell
BY
Brockett, Hyde, Higley & Meyer
ATTORNEYS Patented Sept. 13, 1932

1,876,616

UNITED STATES PATENT OFFICE

EDWIN L. CONNELL, OF CLEVELAND, OHIO, ASSIGNOR TO THE VAN DORN ELECTRIC TOOL COMPANY, OF CLEVELAND, OHIO, A CORPORATION OF OHIO

POWER TOOL

Application filed December 3, 1929. Serial No. 411,340.

This invention relates to portable power driven tools adapted to be applied to the work by the operator. Such a tool as is here contemplated may be a drill, valve grinder, tapper, screwdriver or the like wherein a spindle is driven through gearing and friction clutch means by an electric motor, all of these parts being carried by a housing.

An object of the present invention is to provide a novel arrangement whereby cooling of the clutch means is had. A further object of the invention is to provide an arrangement whereby certain working parts such as the gears may run in a lubricant whereas other parts such as the motor and clutch run in circulating air. Still another object of the invention is to provide novel means for adjustment of the clutch friction.

The exact nature of the invention together with further objects and advantages thereof will be apparent from the following description taken in connection with the accompanying drawing which is a view generally in longitudinal section through a tool illustrative of my invention.

With reference now to the drawing the frame of the tool is made up of three principal parts 1, 2 and 3, and a handle part 3a. The part 2 is disposed between the parts 1 and 3, and as indicated the parts 1 and 3 are generally hollow while the part 2 includes a transverse wall 4, so that the three parts in assembly provide a housing having a pair of cavities 5 and 6 separated by the wall 4.

The housing part 1 is at the working end of the tool and carries a spindle 7 rotatably mounted therein, the spindle being provided with the usual chuck for receiving the shank of a drill, screwdriver, tap or the like.

The housing part 3 is at the driving end of the tool and has mounted therein an armature 8 cooperative with field 9, conventionally shown, to form the principal parts of the usual electric motor.

Driving connection for actuating the spindle 7 by operation of the motor is provided and includes generally gear means within the cavity 5, and clutch means within the cavity 6.

In the tool shown, wherein the spindle 7 is to rotate, the gearing includes merely a set of spur toothed reduction gears. More specifically, the spindle 7 carries a head member 13 cooperative with a similar member 14 to form a dental clutch. The member 14 is carried on a pin 15 mounted for rotation in the central housing member 2. Secured upon the pin 15 is a gear 16 cooperative with a pinion 17 carried on a jack shaft which also carries an intermediate gear 18. The gear 18 meshes with the pinion 19 of a second jack shaft 20 which also carries a gear 21. Mounted in a pair of ball bearings 22 and 23 is a shaft 24 aligned with the armature 8 of the motor. The shaft 24 has pinion teeth 25 cut thereinto adapted to mesh with the teeth of the gear 21. The parts are so proportioned and arranged that drive is had as indicated between the spindle 7 and the shaft 24, obviously with a great reduction in speed of the spindle 7 relative to that of the shaft 24.

The shaft 24 extends beyond its bearing 23 in the wall 4, and into the cavity 6, where it is provided with a head 26. The shaft 29 of the armature 8 carries an adjacent head 27 keyed as at 27a; and between these parts is arranged a friction disk 28 so that these parts together comprise a friction clutch of disk type. The disk 28 may be arranged to float as indicated, carried by the armature shaft 29 slidable and rotatable in the indicated socket in the end of the shaft 24, so that effectively the armature is supported in the bearing 23.

The member 27 extends transversely as indicated terminating just free of the peripheral wall of the cavity 6. The hub portion 10 of a fan member is forced over the corresponding portion of the member 27 to rotate with the armature 8. This fan member includes a number of radially extending peripherally spaced blades 30 supported by the indicated spider portion intermediate the blades and hub portion 10. The blades 30 abutting the peripheral portion of the member 27, a centrifugal fan is formed, the member 27 thus serving as a fan part as well as a clutch part so that circulation through the fan very efficiently carries off heat generated in the clutch. The housing 3 is provided with air inlet openings and peripherally spaced outlet openings 12 for controlling the action of the fan to cool the armature 8.

The bearing 22 is of thrust type with its outer race slidable in the housing member 1. The outer race is backed, however, by a compression spring 31 which in turn is backed by the head 32 of an adjusting screw 33 which extends through the wall of the housing member 1 so that it may be turned from without the tool, to adjust the tension of the spring 31. Obviously the parts are so arranged that this spring maintains the clutch parts in frictional engagement, so that by adjustment of the screw 33 the friction characteristics of the clutch is variable.

It will be observed that the cavity 5 is substantially enclosed whereby the moving parts therein may operate in a fluid lubricant; whereas in the cavity 6, which contains those parts which generate heat in their operation, a constant circulation of cooling air is effected by the single fan during operation of the parts.

What I claim is:

1. In a tool of the class described, a spindle, an electric motor, driving connections therebetween and including a pair of cooperating friction clutch members, one of said clutch members being fixedly mounted upon the armature of said motor and one end of said armature being journalled in said other clutch member, spring means effective upon the clutch member in which said armature end is journalled for producing frictional driving engagement of said clutch members, a housing carrying the aforementioned elements, and a single means operable from outside said housing for effecting adjustment of said spring means to thereby control the degree of frictional driving engagement of said clutch members.

2. In a tool of the class described, a spindle, a motor, gearing operatively connected to said spindle and including a longitudinally movable gear-carrying shaft, a friction clutch part operatively connected to said motor, a cooperating friction clutch part fast upon said shaft, whereby said motor is operatively connected to said spindle by means of said gearing and said cooperating clutch parts, spring means effective upon said shaft for producing frictional driving engagement of said clutch parts, a housing carrying the aforementioned elements, and a single means operable from outside said housing for effecting adjustment of said spring to thereby control longitudinal movement of said shaft and hence the degree of frictional driving engagement of said clutch parts.

3. In a tool of the class described, a spindle, an electric motor, gearing operatively connected to said spindle and including a constantly meshing gear fast upon a longitudinally movable shaft, a friction clutch part fixedly mounted upon the armature of said motor, a cooperating friction clutch part fast upon said shaft, whereby said motor is operatively connected to said spindle by means of said gearing and said cooperating clutch parts, said shaft and said motor armature being in axial alignment, spring means effective upon said shaft for producing frictional driving engagement of said clutch parts, a housing carrying the aforementioned elements, and a single means operable from outside said housing for effecting adjustment of said spring means to thereby control longitudinal movement of said shaft and hence the degree of frictional driving engagement of said clutch parts.

4. In a tool of the class described, a spindle, an electric motor, gearing operatively connected to said spindle and including a longitudinally movable, gear-carrying shaft, a friction clutch part fast upon the armature of said motor, a cooperating friction clutch part fast upon one end of said shaft, whereby said motor is operatively connected to said spindle by means of said gearing and said cooperating clutch parts, said motor armature and said shaft being in axial alignment and one end of said armature being journalled in that end of said shaft which carries said clutch part, spring means effective upon said shaft for producing frictional driving engagement of said clutch parts, a housing carrying the aforementioned elements, and a single means operable from outside said housing for effecting adjustment of said spring to thereby control longitudinal movement of said shaft and hence the degree of frictional driving engagement of said clutch parts.

5. In a tool of the class described, a spindle, an electric motor, gearing operatively connected to said spindle and including a constantly meshing gear fast upon a longitudinally movable shaft, a friction clutch part fast upon the armature of said motor, a cooperating friction clutch part fast upon one end of said shaft, whereby said motor is operatively connected to said spindle by means of said gearing and said cooperating clutch parts, bearing means for the clutch part-carrying end portion of said shaft and bearing means for the other end portion of said shaft, said last mentioned bearing means being secured upon said shaft for movement therewith, said motor armature having one of its ends journalled in the clutch part-carrying end of said shaft, spring means effective upon that bearing means secured upon and movable with said shaft for producing longitudinal movement of said shaft to effect frictional driving engagement of said clutch parts, a housing carrying the aforementioned elements, and a single means operable from outside said housing for effecting adjustment of said spring means to thereby control longitudinal movement of said shaft and hence the degree of frictional driving engagement of said clutch parts.

6. In a tool of the character described, a spindle, an electric motor, gearing operatively connected to said spindle and including a constantly meshing gear fast upon a longitudinally movable shaft, a friction clutch part fast upon the armature of said motor, a cooperating friction clutch part fast upon one end of said shaft, whereby said motor is operatively connected to said spindle by means of said gearing and said cooperating clutch parts, said motor armature having one of its ends journalled in the clutch part-carrying end of said shaft, a housing carrying the aforementioned elements and having a cross wall dividing the interior of said housing into a front chamber in which said gearing and said shaft are arranged and a rear chamber in which are arranged said motor and said clutch parts, bearing means for the clutch part-carrying end of said shaft mounted in said housing cross wall, bearing means for the other end of said shaft secured upon said shaft and movable therewith, spring means effective upon said last mentioned bearing means for producing longitudinal movement of said shaft to effect frictional driving engagement of said clutch parts, and a single means operable from outside said housing for effecting adjustment of said spring means to thereby control longitudinal movement of said shaft and hence the degree of frictional driving engagement of said clutch parts.

In testimony whereof I hereby affix my signature.

EDWIN L. CONNELL.